(12) United States Patent
Hirashima et al.

(10) Patent No.: US 8,392,652 B2
(45) Date of Patent: Mar. 5, 2013

(54) VIRTUAL TAPE SYSTEM

(75) Inventors: Nobuyuki Hirashima, Kawasaki (JP);
Shigeru Tsukada, Kawasaki (JP);
Takaaki Yamato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 878 days.

(21) Appl. No.: 12/503,530

(22) Filed: Jul. 15, 2009

(65) Prior Publication Data

US 2010/0030957 A1 Feb. 4, 2010

(30) Foreign Application Priority Data

Jul. 30, 2008 (JP) .................. 2008-195987

(51) Int. Cl.
*G06F 12/00* (2006.01)
*G06F 13/00* (2006.01)

(52) U.S. Cl. ......... 711/111; 711/100; 711/154; 711/170

(58) Field of Classification Search .................. 711/100, 711/111, 154, 170
See application file for complete search history.

(56) References Cited

U.S. PATENT DOCUMENTS 6,317,814 B1 11/2001 Blendermann et al.
2005/0207235 A1* 9/2005 Blendermann et al. .. 365/189.05
2008/0077758 A1 3/2008 Ohmido

FOREIGN PATENT DOCUMENTS

JP 2008-077519 4/2008
WO WO 00/02125 1/2000

* cited by examiner

*Primary Examiner* — Tuan V. Thai
(74) *Attorney, Agent, or Firm* — Staas & Halsey LLP

(57) ABSTRACT

A virtual tape system includes an actual tape device having a magnetic tape which stores data. The virtual tape system includes a virtual tape storage device which stores data stored in the actual tape device as a virtual tape volume, first computers to be connected to a host computer which instructs a storing of data in the actual tape device, and a reading of data from the actual tape device, control an interface with the host computer, second computers which control the virtual tape volume of the virtual tape storage device, third computers which control a writing of the data into the actual tape device, and a local disk controller which stores the data in one of storage devices mounted one in each of the first computers, each of the second computers, and each of the third computers.

11 Claims, 12 Drawing Sheets

VIRTUAL TAPE SYSTEM

CROSS-REFERENCE TO RELATED APPLICATIONS

This application is related to and claims the benefit of Application No. 2008-195987, filed on Jul. 30, 2008, in the Japan Patent Office, the disclosure of which is incorporated herein by reference.

BACKGROUND

1. Field

An embodiment of the present invention discussed herein relates to a virtual tape system including an actual tape device which stores data on a magnetic tape, and a virtual tape storage device which stores the data, stored in the actual tape device, as a virtual tape volume.

2. Description of the Related Art

A virtual tape system is a system including a virtual tape storage device which stores data stored in an actual tape device as a virtual tape volume. A virtual tape system can control a reading and writing of data at a high speed by the same interface as with a control of a magnetic tape (refer to, for example, Japanese Laid-open Patent Publication No. 2008-077519 and Japanese Laid-open Patent Publication (Translation of PCT Application) No. 2002-520693). Hereafter, a description will be given of a configuration of a heretofore known virtual tape system.

An outline of the virtual tape system is illustrated in FIG. 12.

The virtual tape system 10 is a system which stores data specified by a host computer 11 in an actual tape device 14 and a virtual tape storage device 12. The system includes integrated channel processors (ICPs) 13 connected to the host computer 11, integrated device processors (IDPs) 15 provided between the actual tape device 14 and the ICPs 13, and virtual library processors (VLPs) 16 which execute an overall management.

The ICPs 13, being connected to the host computer 11 via an switch device (not shown), carry out a control of an interface with the host computer 11.

The VLPs 16 execute a control of the whole virtual tape system 10, a management of the volume of the virtual tape storage device 12, and the like.

The IDPs 15 execute a process of backing up, and a process of restoring, the actual tape device 14 with a logical volume of the virtual tape storage device 12.

This kind of virtual tape system 10 employs a redundant configuration by including in advance a plurality of the ICPs 13, a plurality of the VLPs 16, and a plurality of the IDPs 15.

On a write command which is an instruction to write data being issued from the host computer 11, an ICP 13 receives the write command. The ICP 13 recognizes a command category or the like, and executes a control of writing the data into the virtual tape storage device 12.

A VLP 16, based on a result of the process of the ICP 13, executes the management of the volume of the virtual tape storage device 12.

Also, an IDP 15 receives a write command from the VLP 16 and, based on the write command received, executes a control of writing the data into the actual tape device 14.

In the virtual tape system, data which are to be stored are stored in both the actual tape device and virtual tape storage device. Then, a construction is such that, even in the event that one of the devices is inaccessible, or data are lost in one of the devices, a data loss in the whole system is prevented, and a data protection is reliably carried out.

However, in the event that a storing of data is carried out by only the virtual tape storage device due to a failure of the actual tape device, the storing of data is executed by only the virtual tape storage device (a degenerate operation of the virtual tape storage device). This condition continues until the actual tape device is restored but, in the event that a trouble occurs in the virtual tape storage device before the restoration, a data loss occurs.

Also, in the event that an amount of data which are to be stored in the virtual tape storage device exceeds free space of the virtual tape storage device, a write request from the host computer is in a wait status until the actual tape device is restored.

Meanwhile, even in a condition in which both the actual tape device and virtual tape storage device are accessible, in the event that an amount of data based on the write request from the host computer exceeds the free space of the virtual tape storage device, data, among the data stored in the virtual tape storage device, for which fewest access requests are made are deleted from the virtual tape storage device, and a storing of data is carried out using space available due to the deletion (which may be referred to hereafter as a migration process).

The data deleted from the virtual tape storage device by this kind of migration process are stored in the actual tape device. For this reason, in the event that a read request for the data subjected to the migration process is made from the host computer, the data are read from the actual tape device. When reading the data from the actual tape device, a mechanical operation is necessary, such as a tape mounting, or an access to a storage position of the data on a tape. For this reason, it takes more time than in a normal data reading (a reading from the virtual tape storage device).

SUMMARY

A virtual tape system includes an actual tape device having a magnetic tape which stores data. The virtual tape system includes a virtual tape storage device which stores data stored in the actual tape device as a virtual tape volume, first computers to be connected to a host computer which instructs a storing of data in the actual tape device, and a reading of data from the actual tape device, control an interface with the host computer, second computers which control the virtual tape volume of the virtual tape storage device, third computers which control a writing of the data into the actual tape device, and a local disk controller which stores the data in one of storage devices mounted one in each of the first computers, each of the second computers, and each of the third computers.

It is to be understood that both the foregoing general description and the following detailed description are exemplary and explanatory and are not restrictive of the embodiment, as claimed.

The above-described embodiments of the present invention are intended as examples, and all embodiments of the present invention are not limited to including the features described above.

DETAILED DESCRIPTION OF THE PREFERRED EMBODIMENTS

Figure 1:
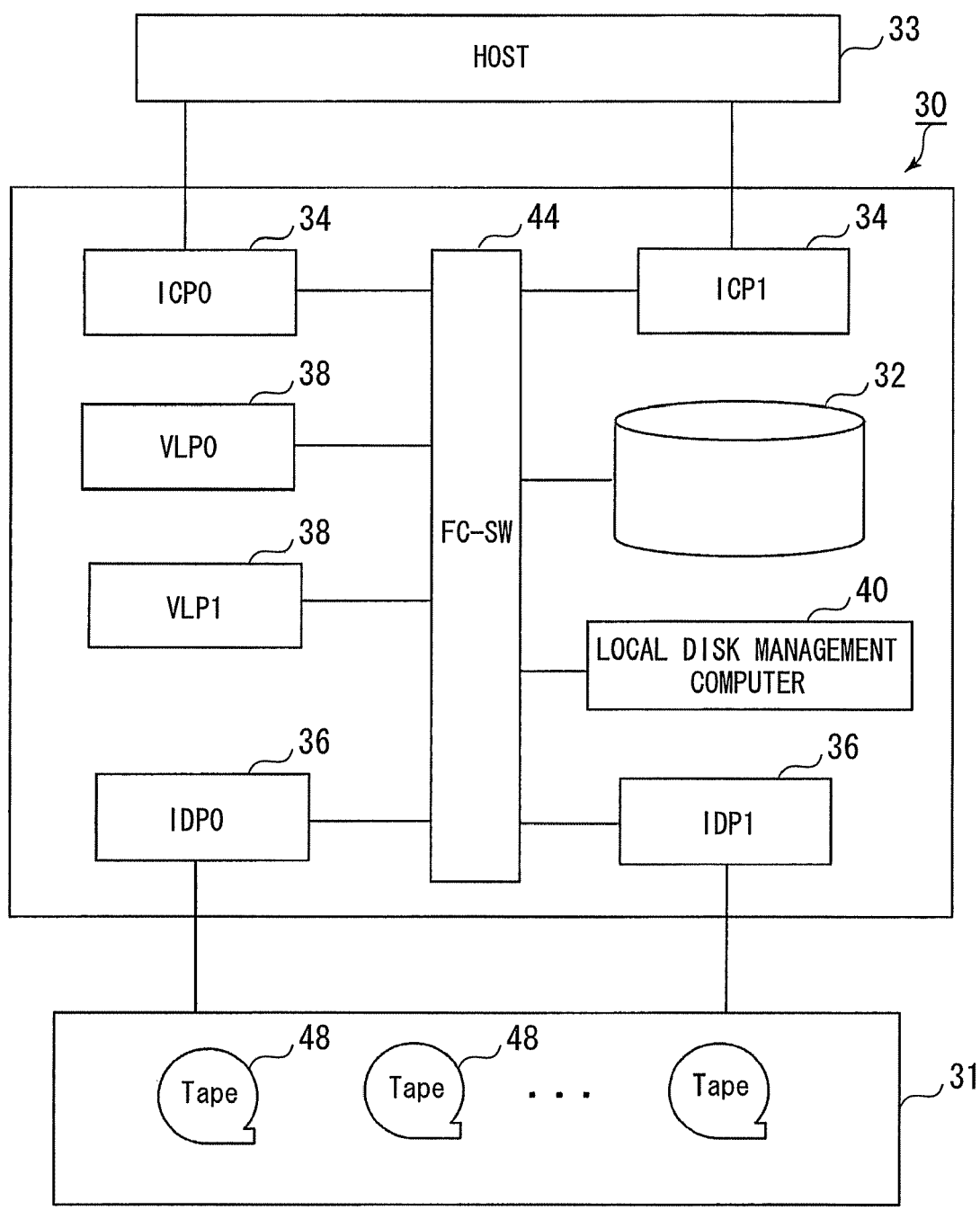
FIG. 1 illustrates a configuration of a virtual tape system according to one embodiment.

Reference may now be made in detail to embodiments of the present invention, examples of which are illustrated in the accompanying drawings, wherein like reference numerals refer to like elements throughout.

FIG. 1 illustrates a configuration of a virtual tape system according to one embodiment. The virtual tape system 30 includes a plurality of actual tape devices 31, a virtual tape storage device 32, a plurality of integrated channel processors (ICPs) 34, a plurality of integrated device processors (IDPs) 36, two virtual library processors (VLPs) 38, and a local disk management computer 40. Herein, the ICPs 34 correspond to first computers, the VLPs 38 to second computers, and the IDPs 36 to third computers.

Each of the ICPs 34, IDPs 36, and VLPs 38 is a computer having a unique function. The local disk management computer 40 has a function of controlling a storing of data in each computer. The local disk management computer 40 includes storage devices, as shared disks, which operate on the ICPs 34, IDPs 36, and VLPs 38, and whose original purpose is to save programs for operations of the ICPs 34, IDPs 36, and VLPs 38, and records of the operations. Thus, the local disk management computer 40 is a computer which controls in such a way as to cause data stored in the virtual tape storage device 32 and actual tape device 31 to be also stored in the storage devices. Specifically, the local disk management computer 40 is intended to save data by effectively utilizing free space of the storage devices of the ICPs 34, IDPs 36, and VLPs 38. A hard disk drive is used as each storage device.

The ICPs 34 of the embodiment are each connected in parallel to an upper switch device (not illustrated) by a communication line such as a fibre channel (FC) line. The upper switch device is connected to a host computer 33 of a main frame system. The FC line includes an optical fiber, a coaxial cable, or the like.

The ICPs 34, virtual tape storage device 32, and IDPs 36 are connected to a medium switch device 44 through the FC line. The ICPs 34 and IDPs 36 are each connected in parallel to the medium switch device 44.

Also, the two VLPs 38 are each connected to the medium switch device 44 by a local area network (LAN) connection or the like. An LAN connection standard includes Ethernet (trademark) or the like.

The IDPs 36 are each connected in parallel to an lower switch device (not illustrated) through the FC line.

Also, the actual tape devices 31 are each connected in parallel to the lower switch device by a peripheral equipment connection standard, the LAN connection, or the FC line. Herein, the peripheral equipment connection standard includes a small computer system interface (SCSI) or the like.

Hereafter, a description will be given of each device configuring the virtual tape system 30 of the embodiment.

(Actual Tape Device)

Figure 2:
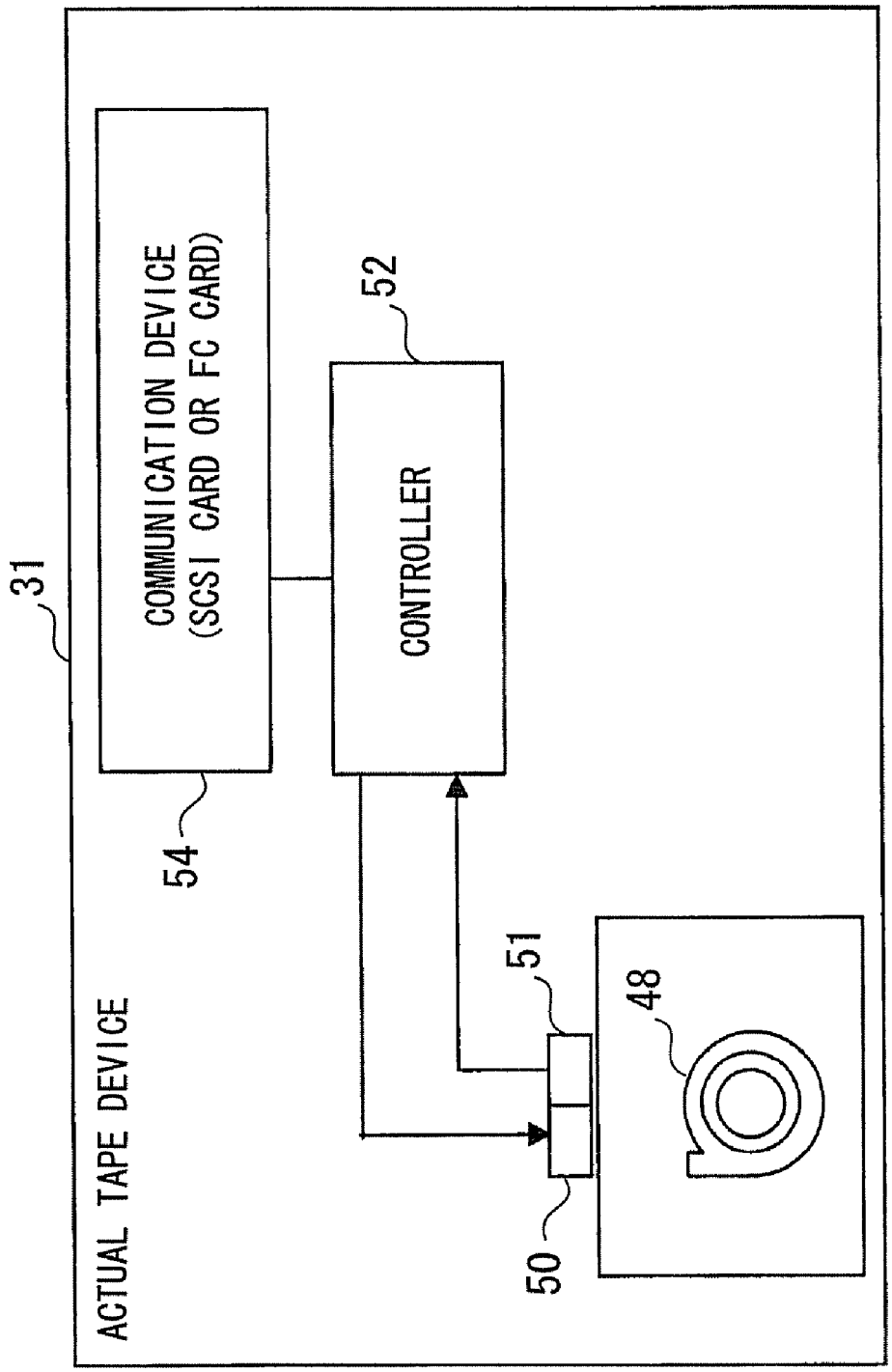
FIG. 2 illustrates an actual tape device configuring the virtual tape system.

As illustrated in FIG. 2, the actual tape device 31 includes a cartridge type magnetic tape 48, a recording head 50 capable of writing data onto the magnetic tape 48, and a reading head 51 capable of reading data from the magnetic tape 48. Also, the actual tape device 31, including a controller 52 provided with a CPU and a memory, is controlled by the controller 52. Also, a communication device 54, such as an SCSI card or an FC card, is connected to the controller 52, and communicably connected to the lower switch device.

(IDP)

Figure 3:
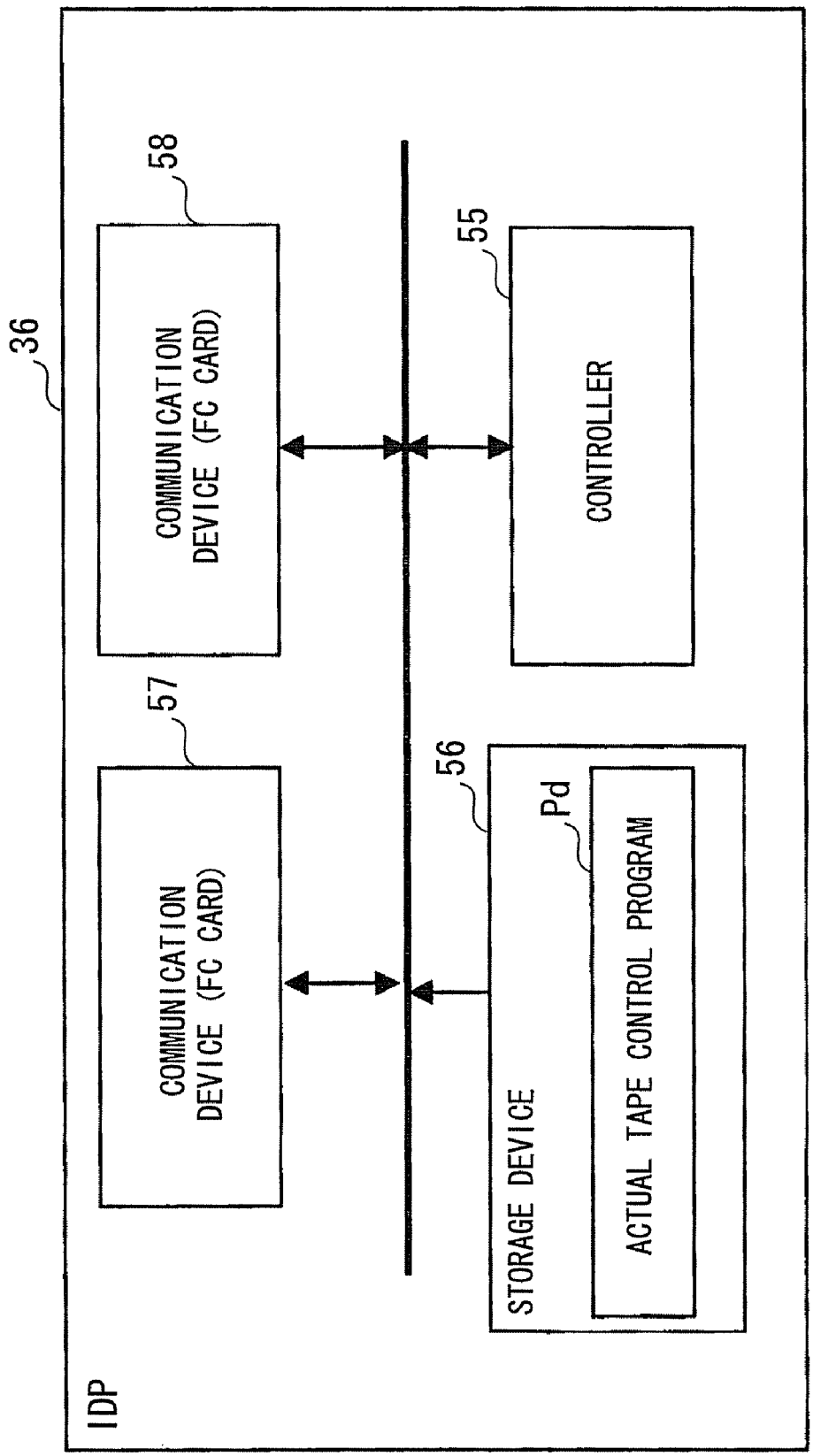
FIG. 3 illustrates a configuration of an IDP configuring the virtual tape system.

As illustrated in FIG. 3, the IDP 36 includes a controller 55 provided with a CPU and a memory, and a storage device 56 in which an actual tape control program Pd is stored. Also, the IDP 36 includes a first communication device 57 which executes an exchange of data with the medium switch device 44, and a second communication device 58 which executes an exchange of data with the lower switch device. A magnetic disk device is employed as the storage device 56.

The actual tape control program Pd stored in the storage device 56 of the IDP 36 is described in such a way as to cause the IDP 36 to realize a function for executing a process of backing up, or a process of restoring, the actual tape device 31 with a logical volume of the virtual tape storage device 32 (shown in FIG. 1). That is, the process of backing up or restoring the magnetic tape 48 with the logical volume of the virtual tape storage device 32 is realized by the controller 55 of the IDP 36 reading and executing the actual tape control program Pd.

(Virtual Tape Storage Device)

Figure 4:
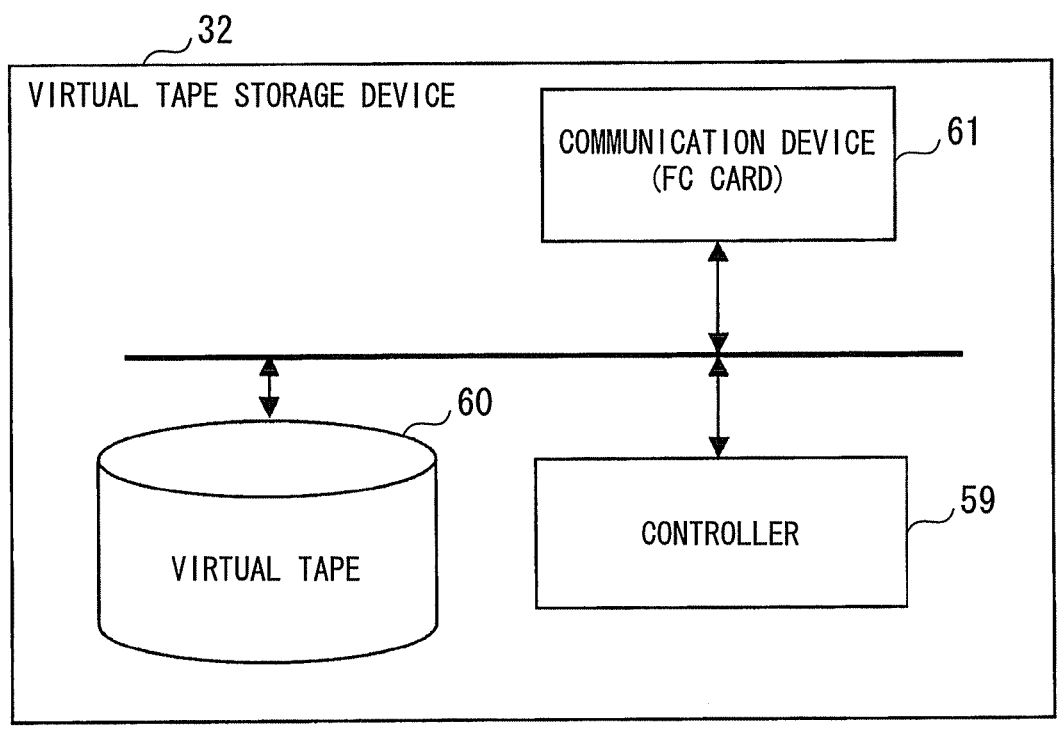
FIG. 4 illustrates a configuration of a virtual tape storage device configuring the virtual tape system.

As illustrated in FIG. 4, the virtual tape storage device 32 includes a controller 59 provided with a CPU and a memory, a magnetic disk device 60, and a communication device 61, such as an FC card, which executes an exchange of data with the medium switch device 44 (shown in FIG. 1). The magnetic disk device 60 functions as a virtual tape (a tape volume cache).

(ICP)

Figure 5:
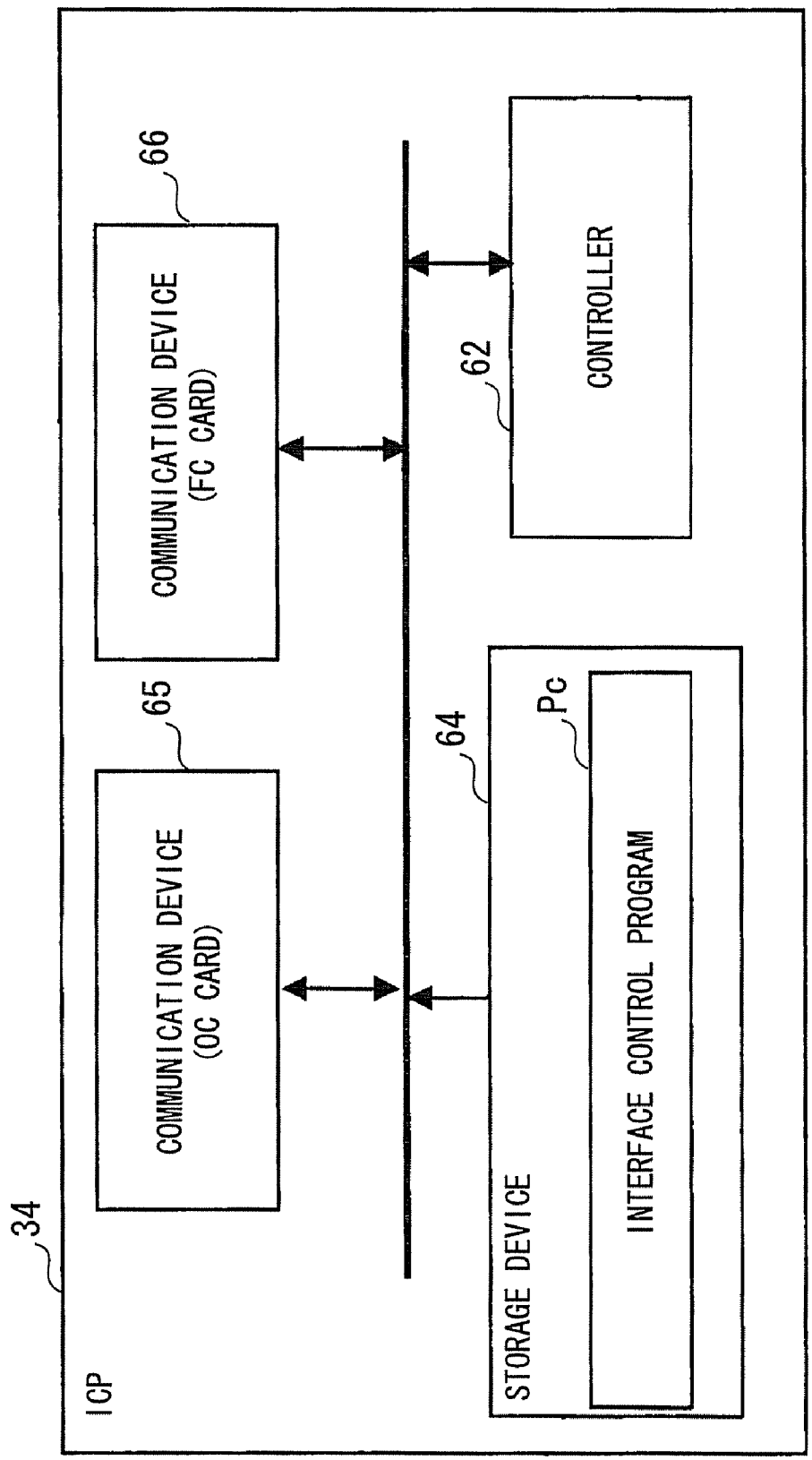
FIG. 5 illustrates a configuration of an ICP configuring the virtual tape system.

As illustrated in FIG. 5, the ICP 34 includes a controller 62 provided with a CPU and a memory, and a storage device 64 in which is stored an interface control program Pc. Also, the ICP 34 includes a first communication device 65 which executes an exchange of data with the upper switch device (not illustrated), and a second communication device 66 which executes an exchange of data with the medium switch device 44 (shown in FIG. 1). An FC card, an OC (synchronous optical network/synchronous digital hierarchy (SONET/SDH) standard) card, and the like apply as examples of the first communication device 65 and second communication device 66. A magnetic disk device is employed as the storage device 64.

The interface control program Pc stored in the storage device 64 of the ICP 34 is described in such a way as to cause the ICP 34 to execute a function of analyzing a command received from the host computer and, in the event that the received command is a data read/write command, realizing a process of reading data from, or writing them into, the virtual tape storage device 32, and transmitting a result of the reading/writing process to the VLP 38 (shown in FIG. 1).

That is, by the controller 62 of the ICP 34 reading and executing the interface control program Pc, it is possible to realize a performing of the data reading/writing process on the virtual tape storage device 32, and a transmitting of the reading/writing process result to the VLP 38.

(VLP)

Figure 6:
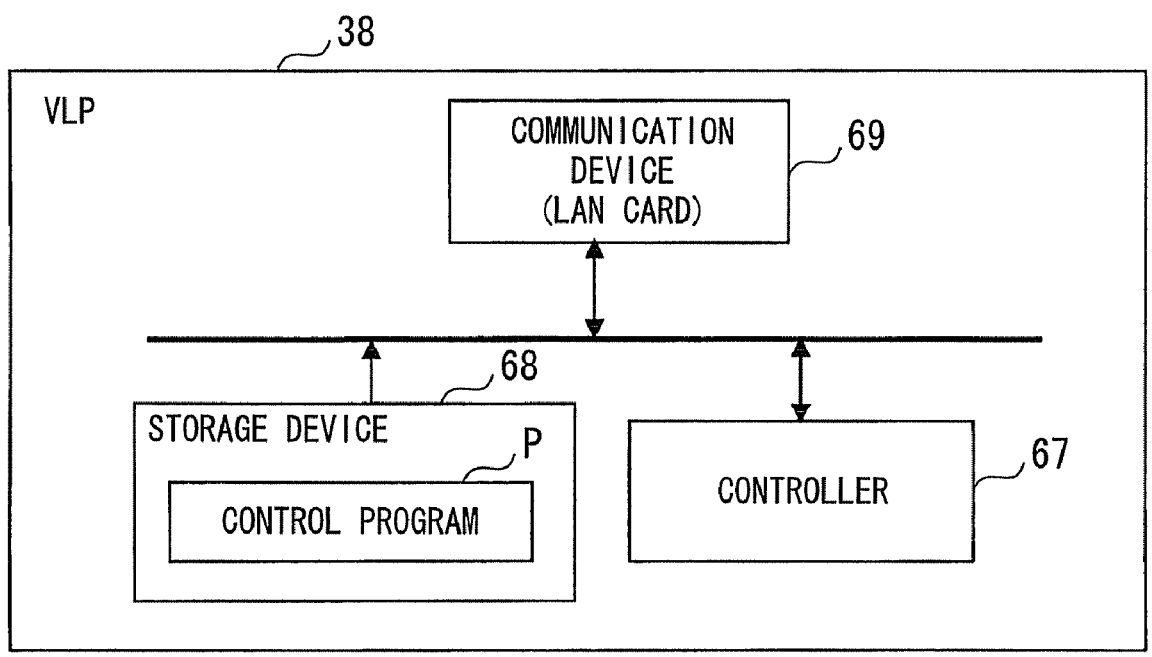
FIG. 6 illustrates a configuration of a VLP configuring the virtual tape system.

As illustrated in FIG. 6, the VLP 38 includes a controller 67 having a CPU and a memory, a storage device 68 in which is stored a control program P, and a communication device 69 which executes an exchange of data with the medium switch device 44 (shown in FIG. 1). A LAN card for a LAN connection to the medium switch device 44 applies as the communication device 69 used herein. A magnetic disk device is employed as the storage device 68.

The control program P stored in the storage device 68 of the VLP 38 is described in such a way as to cause the VLP 38 to realize a function of executing a management of the volume of the virtual tape storage device 32, a management of the volume of the actual tape device 31, or the like, and a function of controlling the whole system. That is, by the controller 67 of the VLP 38 reading and executing the control program P, it is possible to realize the management of the volume of the virtual tape storage device 32, the management of the volume of the actual tape device 31, and the control of the whole system.

Although two VLPs 38 are provided in the embodiment, it does not mean that the two VLPs 38 operate at the same time, but that one VLP 38 is provided as a backup (a redundant VLP).

That is, one of the two VLPs 38 provided, normally being out of operation and on standby, operates by taking over the operation of the VLP 38 in which the abnormality has occurred in the event that an abnormality occurs in the other VLP 38 in operation.

(Local Disk Management Computer)

Figure 7:
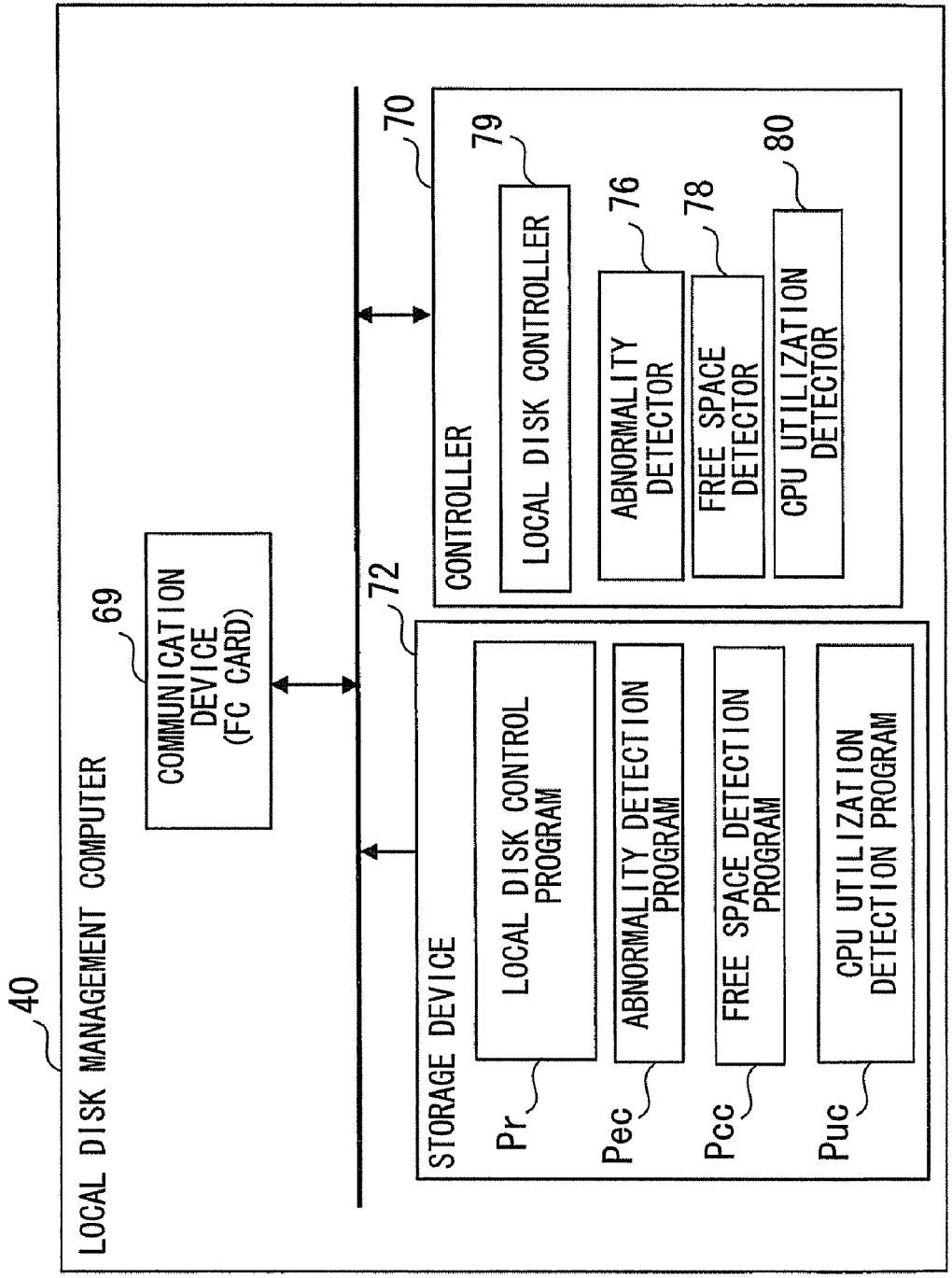
FIG. 7 illustrates a configuration of a local disk management computer configuring the virtual tape system.

As illustrated in FIG. 7, the local disk management computer 40 includes a controller 70 having a CPU and a memory, a storage device 72 in which is stored a local disk control program Pr, and a communication device 69 which executes an exchange of data with the medium switch device 44 (shown in FIG. 1).

By the controller 70 reading and executing the local disk control program Pr, a local disk controller 79 is realized which executes a distribution of data to the storage device 56 mounted in each IDP 36 (shown in FIG. 3), the storage device 64 mounted in each ICP 34 (shown in FIG. 5), or the storage device 68 mounted in each VLP 38 (shown in FIG. 6), and a management of the data.

Also, the local disk management computer 40 includes an abnormality detector 76. The abnormality detector 76 is realized by the controller 70 reading and executing an abnormality detection program Pec stored in the storage device 72 of the local disk management computer 40.

The abnormality detector 76 constantly confirms an operation of each actual tape device 31 and, from the fact that the operation of one actual tape device 31 (shown in FIG. 1) has stopped, recognizes that the actual tape device 31 is abnormal.

Also, the local disk management computer 40 includes a free space detector 78. The free space detector 78 is realized by the controller 70 reading and executing a free space detection program Pcc stored in the storage device 72 of the local disk management computer 40.

The free space detector 78 detects free space of the storage device 64 of each ICP 34, free space of the storage device 68 of each VLP 38, and free space of the storage device 56 of each IDP 36.

Also, the local disk management computer 40 includes a CPU utilization detector 80. The CPU utilization detector 80 is realized by the controller 70 reading and executing a CPU utilization detection program Puc stored in the storage device 72 of the local disk management computer 40.

Operation Example 1

Figure 8:
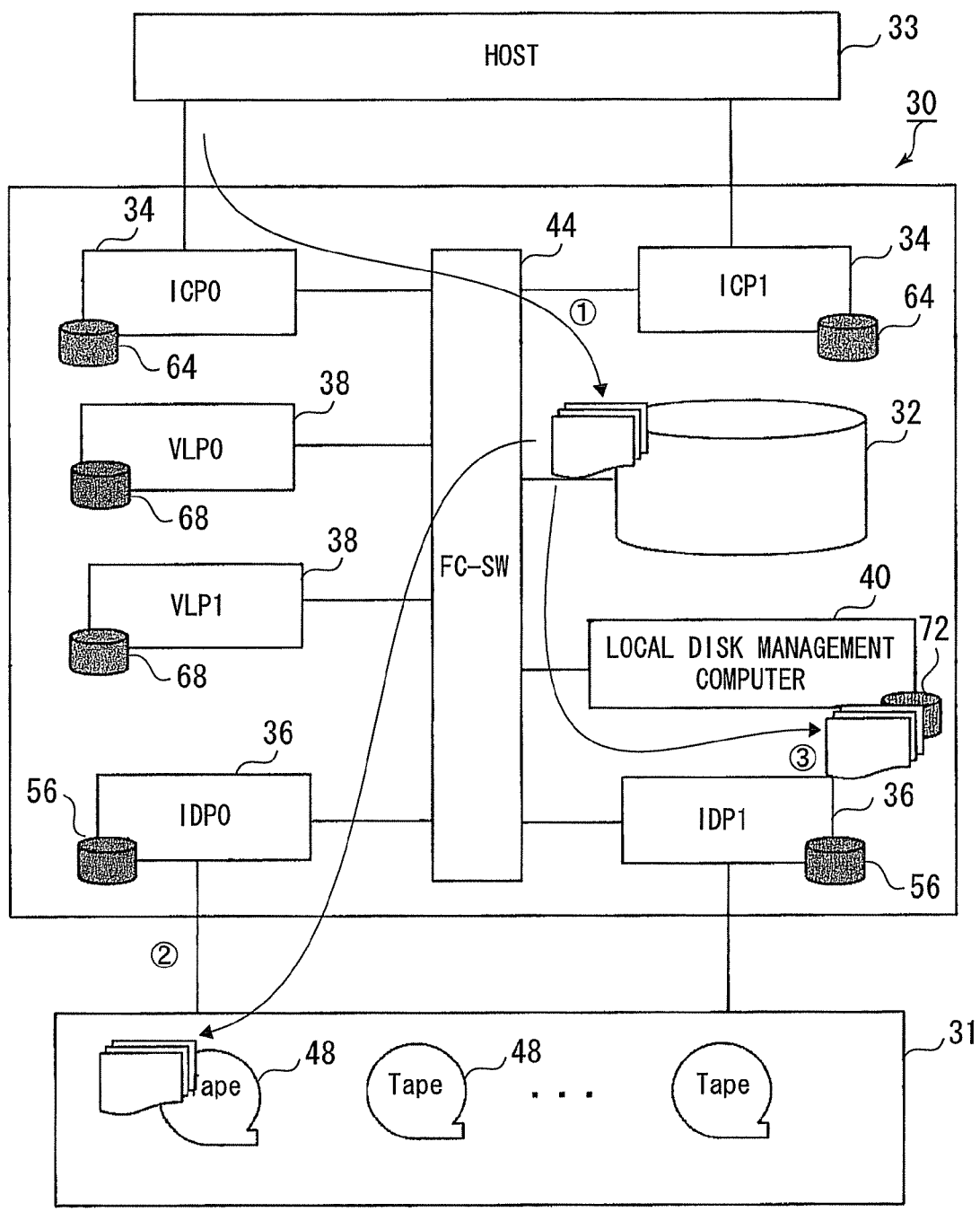
FIG. 8 illustrates an operation example of the embodiment.

Hereafter, a description will be given, based on FIGS. 8 and 9, of one example of operations in the virtual tape system 30 of the embodiment.

On a write command being issued from the host computer 33, an ICP 34 stores data in the virtual tape storage device 32, and transmits a result of the data storage to a VLP 38. Furthermore, an IDP 36 stores data, the same as the data stored in the virtual tape storage device 32, in the actual tape device 31.

The local disk controller 79 of the local disk management computer 40, with the IDP 36 writing data into the actual tape device 31 as a trigger, stores the same data in its own storage device 72.

By the local disk management computer 40 operating independent of the existence or otherwise of an abnormality of the actual tape device 31 in this way, the same data are constantly stored in three places; the virtual tape storage device 32, the actual tape device 31, and the local disk management computer 40.

On continuing this kind of operation, the free space of the storage device 72 of the local disk management computer 40 decreases. Then, in the event that the free space of the storage device 72 of the local disk management computer 40 reaches zero, or a predetermined amount of space or less, the local disk controller 79 of the local disk management computer 40 selects a storage device in which to store data from among the storage devices of the IDPs 36, ICPs 34, and VLPs 38.

The selection of a storage device in which the local disk controller 79 of the local disk management computer 40 (shown in FIG. 7) is to store data is carried out as follows.

Firstly, the free space detector 78 of the local disk management computer 40 operates, and detects free space of the storage device of each IDP 36, each ICP 34, or each VLP 38. Herein, a computer mounting a storage device having no free space, or the predetermined amount of space or less, is excluded as a data storage subject.

Continuing, the CPU utilization detector 80 of the local disk management computer 40 operates, and detects utilization of the CPU configuring the controller of each IDP 36, each ICP 34, or each VLP 38.

Figure 9:
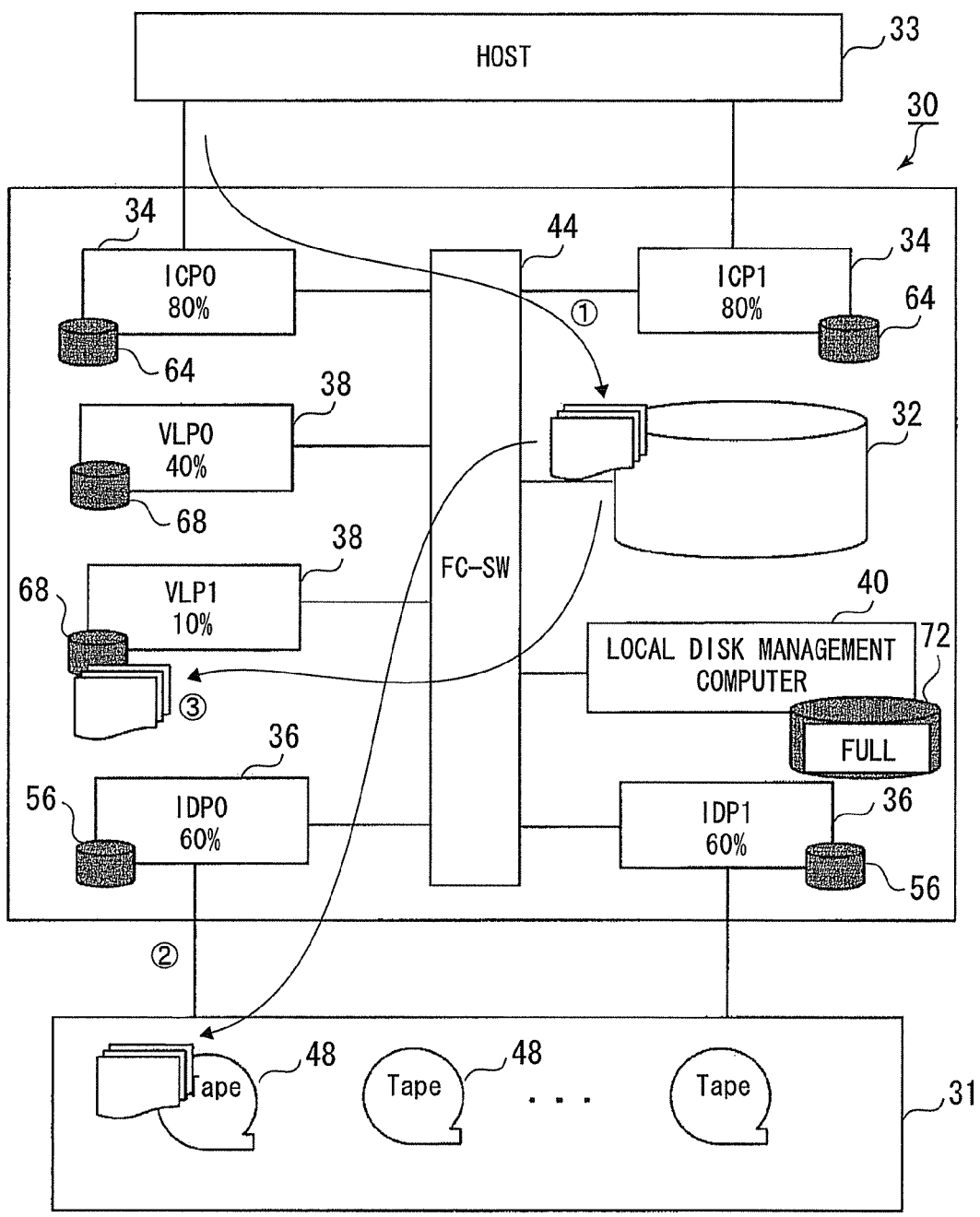
FIG. 9 illustrates an example of a data distribution.

FIG. 9 illustrates a result of the detection of utilization of each CPU by the CPU utilization detector 80 (shown in FIG. 7). In FIG. 9, a VLP1 attains a lowest CPU utilization of 10%. Therein, the local disk controller 79 of the local disk management computer 40 selects the storage device 68 of the VLP1 which is a computer of which the storage device has free space, and the CPU utilization is lowest, and stores data, the same as the data stored in the actual tape device 31 and virtual tape storage device 32, in the storage device 68.

By the local disk management computer operating as in the embodiment, even when the actual tape device is not broken, data which are to be stored in the actual tape device are stored in the storage device of the local disk management computer, each IDP, each ICP, or each VLP, meaning that a data management becomes stricter. Consequently, no data loss occurs even in the event that the virtual tape storage device is broken in this condition.

Also, in the event that the actual tape device 31 is broken while this kind of operation is being implemented, when an amount of data which are to be stored in the virtual tape storage device 32 exceeds the free space of the virtual tape storage device 32, the local disk management computer 40 stores the data in the storage device of each IDP 36, each ICP 34, or each VLP 38. For this reason, it is possible to process the data without causing the write command from the host computer 33 to wait.

Furthermore, deleted data, even though they are data deleted from the virtual tape storage device 32 by a migration process, are stored in the storage device of the local disk management computer 40, each IDP 36, each ICP 34, or each VLP 38.

Figure 10:
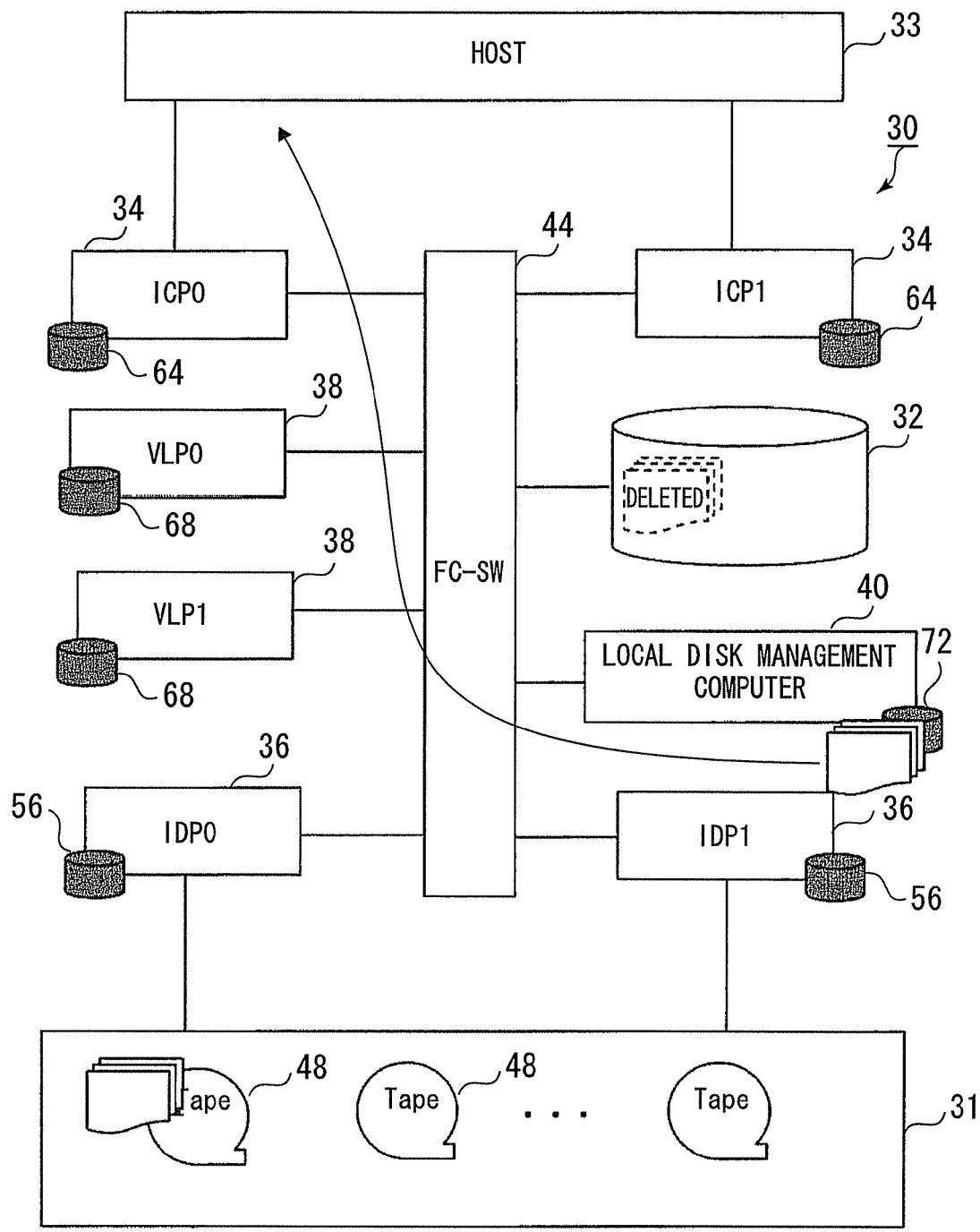
FIG. 10 illustrates a case of reading data in a migrated condition.

FIG. 10 illustrates an operation in a case in which a command to read the data subjected to the migration process is issued from the host computer 33.

As heretofore described, the same data are stored in the three places; the virtual tape storage device 32, the actual tape device 31, and the local disk management computer 40. For this reason, even in the event that data stored in the virtual tape storage device 32 have been deleted by the migration process, as an ICP 36 which has received the read command can extract corresponding data from the storage device 72 of the local disk management computer 40, it is possible to execute a reading of data more quickly than in a case of reading the data subjected to the migration process from the actual tape device 31.

In the event that the local disk management computer 40 stores data in its own storage device 72, or in the storage device of each IDP 36, each ICP 34, or each VLP 38, the data stored in the storage device are not handled as a virtual tape, but handled as data stored on a normal disk. That is, the local disk management computer 40 stores data, as a copy of data from one disk to another, in its own storage device 72, or in the storage device of each IDP 36, each ICP 34, or each VLP 38.

Inside the local disk management computer 40 is constructed a database which manages an area of its own storage device 72, or of the storage device of each IDP 36, each ICP 34, or each VLP 38, in which data are stored. The database is provided in such a way that a storage device, and an area thereof, in which to store predetermined data are searchable using metadata.

Operation Example 2

Figure 11:
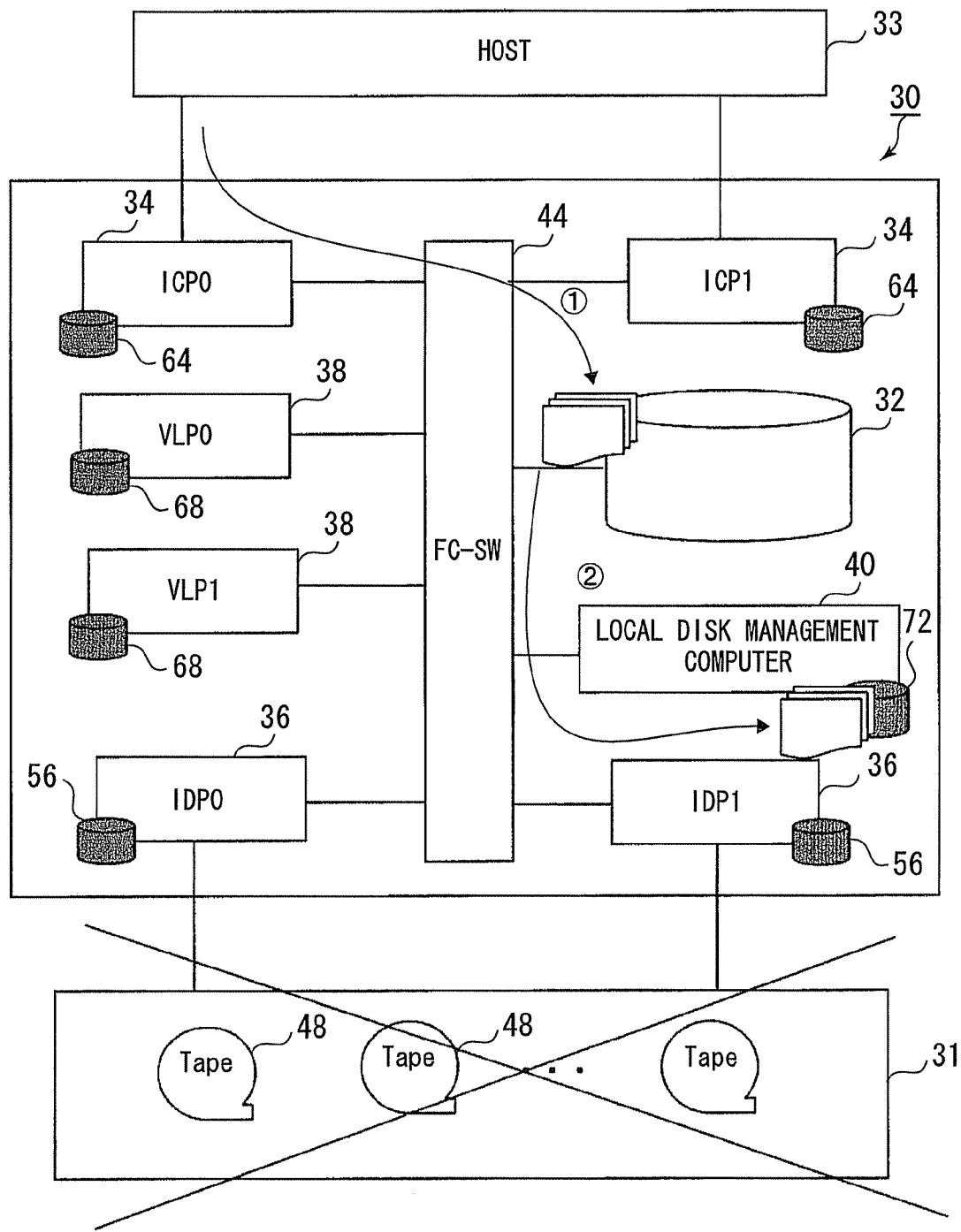
FIG. 11 illustrates a data distribution in a case in which the actual tape device is in a stopped condition.
Figure 12:
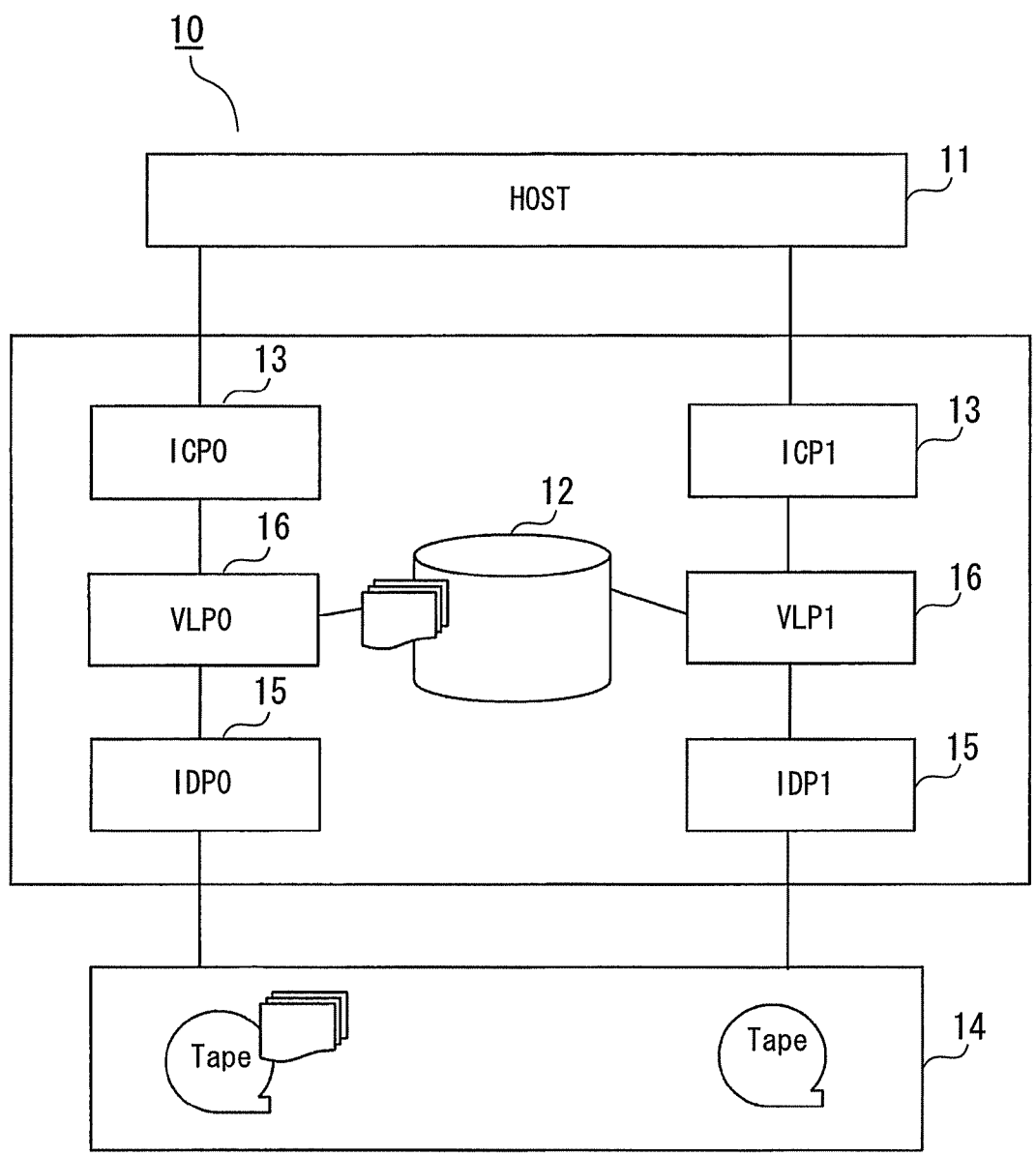
FIG. 12 illustrates a configuration of a heretofore known virtual tape system.

Next, a description will be given, based on FIG. 11, of another example of operations in the virtual tape system 30.

In this operation example, the local disk management computer 40 is provided in such a way as not to operate until it detects the existence or otherwise of an abnormality of the actual tape device 31.

At a normal time, on a write command being issued from the host computer 33, data based on the write command are stored in both the virtual tape storage device 32 and actual tape device 31.

At this time, the local disk management computer 40, causing the abnormality detector 76 to operate, is arranged in such a way as to constantly detect the existence or otherwise of an occurrence of an abnormality of the actual tape device 31.

In the event that the abnormality detector 76 of the local disk management computer 40 (shown in FIG. 7) detects an abnormality of the actual tape device 31, the local disk controller 79 of the local disk management computer 40 is activated and, with data being written into the virtual tape storage device 32 as a trigger, stores the same data in its own storage device 72.

On continuing this kind of operation, free space of the storage device 72 of the local disk management computer 40 decreases. Then, in the event that the free space of the storage device 72 of the local disk management computer 40 reaches zero, or a predetermined amount of space or less, the local disk controller 79 of the local disk management computer 40 selects a storage device in which to store data from among the storage devices of the IDPs 36, ICPs 34, and VLPs 38.

The selection of a storage device in which to store data by the local disk controller 79 of the local disk management computer 40 is carried out as follows.

Firstly, the free space detector 78 of the local disk management computer 40 operates, and detects free space of the storage devices of the IDPs 36, ICPs 34, and VLPs 38. Herein, a computer mounting a storage device having no free space, or the predetermined amount of space or less, is excluded as a data storage subject.

Continuing, the CPU utilization detector 80 of the local disk management computer 40 operates, and detects utilization of the CPU's configuring the controllers of the IDPs 36, ICPs 34, and VLPs 38.

In this way, the local disk controller 79 of the local disk management computer 40 selects the storage device of a computer of which the storage device has free space, and the CPU utilization is lowest, and stores data, the same as the data stored in the actual tape device 31 and virtual tape storage device 32, in the selected storage device.

In the operation example, it is also acceptable that, when the abnormality detector 76 of the local disk management computer 40 detects a restoration of the actual tape device 31, the local disk controller 79 controls in such a way as to stop the operation of storing data in its own storage device 72, or in the storage device of each ICP 34, each VLP 38, or each IDP 36, and cause the data based on the write command to be stored in both the virtual tape storage device 32 and actual tape device 31 as at the normal time.

Other Embodiments

In the heretofore described embodiment, the local disk management computer 40 executes a distribution of data to the storage devices of the ICPs 34, VLPs 38, and IDPs 36, and a management of the data, but it is also acceptable that, without providing the local disk management computer 40, one computer, among the IDPs 36, ICPs 34, and VLPs 38, executes the control of the data distribution and data management.

In this case, the local disk controller 79 is provided in each IDP 36, each ICP 34, or each VLP 38.

That is, the local disk control program Pr is stored in the storage device 56 mounted in each IDP 36, the storage device 64 mounted in each ICP 34, or the storage device 68 mounted in each VLP 38, and the local disk controller 79 is realized by the controller of each IDP 36, each ICP 34, or each VLP 38 reading and executing the local disk control program Pr.

Also, as the virtual tape system, in the event that the plurality of ICPs 34, the virtual tape storage device 32, the VLPs 38, the plurality of IDPs 36, and the actual tape device 31 are included inside one housing, it is preferable to arrange in such a way as to provide the local disk management computer 40 inside the housing. According to this configuration, even in the event that all server computers are included inside a kind of housing having only a limited space, it is possible to achieve a space saving and downsizing of the whole system.

The local disk management computer 40 stores data in its own storage device 72, or in the storage device of each IDP 36, each ICP 34, or each VLP 38, thereby meaning that it is possible to manage the data in differing places, in contrast with a case of simply increasing the disk capacity of the virtual tape storage device 32, enabling an increase in reliability. Simply by increasing the disk capacity of the virtual tape storage device 32, in the event that an abnormality occurs in the virtual tape storage device 32, it is not always true that the reliability of a data saving can be secured.

Also, when comparing with a case of responding by increasing the number of virtual tape storage devices 32, costs become higher in a case of increasing the number of virtual tape storage devices 32 but, in the invention, as free space of the storage device of each IDP 36, each ICP 34, or each VLP 38 is effectively utilized, there is an advantage in that it does not lead to rising costs.

All examples and conditional language recited herein are intended for pedagogical purposes to aid the reader in understanding the principles and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A virtual tape system comprising:
an actual tape device including a magnetic tape which stores data;
a virtual tape storage device which stores data stored in the actual tape device as a virtual tape volume;
first computers to be connected to a host computer which instructs a storing of data in the actual tape device and a reading of data from the actual tape device, the first computers controlling an interface with the host computer;
second computers which control the virtual tape volume of the virtual tape storage device;
third computers which control a writing of the data into the actual tape device; and
a local disk controller which stores the data in one of storage devices mounted one in each of the first computers, each of the second computers, and each of the third computers.

2. The virtual tape system according to claim 1, wherein the local disk controller stores the data in a storage device of a computer, among the storage devices mounted one in each of the first computers, each of the second computers, and each of the third computers, of which free space is largest.

3. The virtual tape system according to claim 1, wherein the local disk controller calculates utilization of processors mounted one in each of the first computers, each of the second computers, and each of the third computers, and stores the data in a storage device of a computer mounting a processor of which utilization is lowest.

4. The virtual tape system according to claim 1, wherein the local disk controller stores the data in one of the storage devices mounted one in each of the first computers, each of the second computers, and each of the third computers when the actual tape device is broken.

5. The virtual tape system according to claim 1, wherein a storage device is included in the local disk controller, and the local disk controller stores the data in its own storage device until the storage device mounted in itself has no more free space and, after the storage device mounted in itself has no more free space, stores the data in one of the storage devices mounted one in each of the first computers, each of the second computers, and each of the third computers.

6. A method of controlling a virtual tape system having an actual tape device which stores data on a magnetic tape, and a virtual tape storage device which stores the data stored in the actual tape device as a virtual tape volume, the method comprising:
receiving data to be stored in the actual tape device by first computers connected to a host computer which instructs storing of data in the actual tape device;
controlling storing of the data in the virtual tape volume by second computers;
controlling storing of the data in the actual tape device by third computers; and
storing the data in one of storage devices mounted in each of the first computers, each of the second computers, or each of the third computers by a local disk controller.

7. The method of controlling the virtual tape system according to claim 6, wherein
the local disk controller stores the data in a storage device of a computer, among the storage devices mounted one in each of the first computers, each of the second computers, and each of the third computers, of which free space is largest.

8. The method of controlling the virtual tape system according to claim 6, wherein
the local disk controller calculates utilization of processors mounted one in each of the first computers, each of the second computers, and each of the third computers, and stores the data in a storage device of a computer mounting a processor of which utilization is lowest.

9. The method of controlling the virtual tape system according to claim 6, wherein
the local disk controller, when the actual tape device is broken, stores the data in one of the storage devices mounted one in each of the first computers, each of the second computers, and each of the third computers.

10. The method of controlling the virtual tape system according to claim 6, wherein
a storage device is included in the local disk controller, and
the local disk controller stores the data in its own storage device until the storage device mounted in itself has no more free space and, after the storage device mounted in itself has no more free space, stores the data in one of the storage devices mounted one in each of the first computers, each of the second computers, and each of the third computers.

11. A virtual tape system comprising:
an actual tape device including a magnetic tape which stores data;
a virtual tape storage device which stores data stored in the actual tape device as a virtual tape volume;

a first computer to be connected to a host computer, the host computer instructing data to be stored on the actual tape device and data to be read from the actual tape device, the first computer controlling an interface with the host computer;

a second computer which controls the virtual tape volume of the virtual tape storage device;

a third computer which controls a writing of the data into the actual tape device; and a local disk controller which stores the data in one of storage devices mounted in one of the first computer, the second computer, or the third computer.

* * * * *